April 17, 1962     A. KRIVDA     3,029,756
AIR INJECTION DRILL
Original Filed March 5, 1959     2 Sheets-Sheet 1
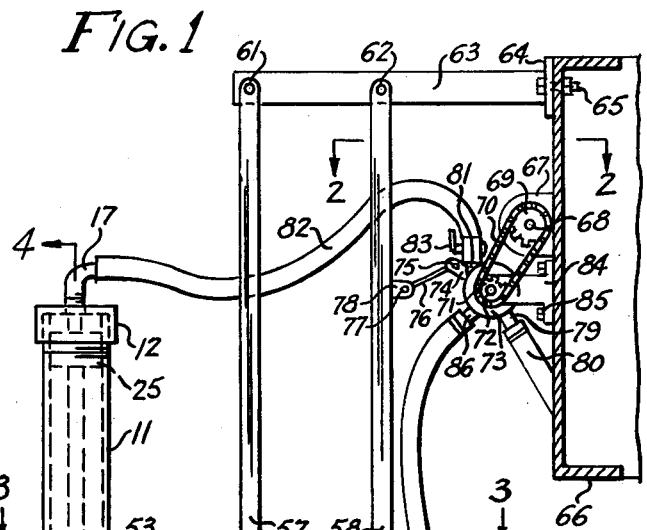
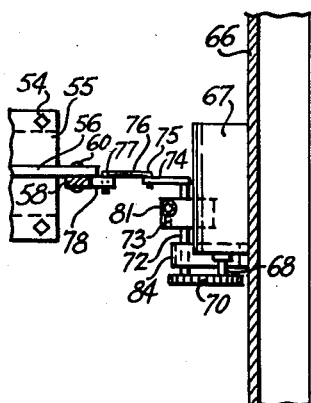
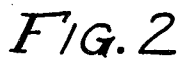
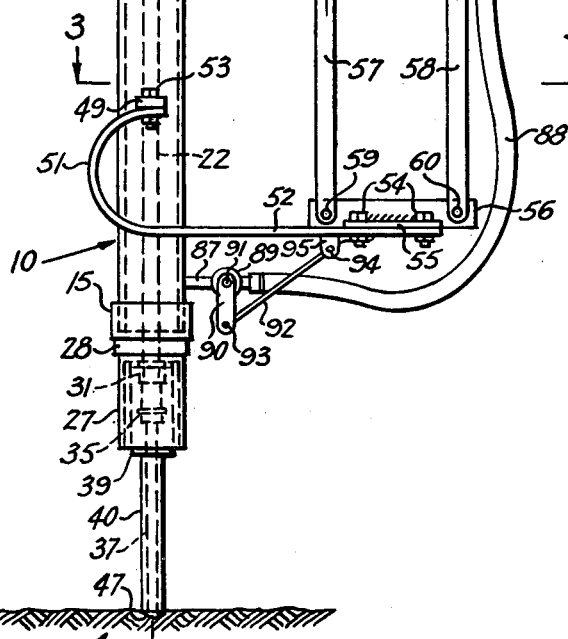
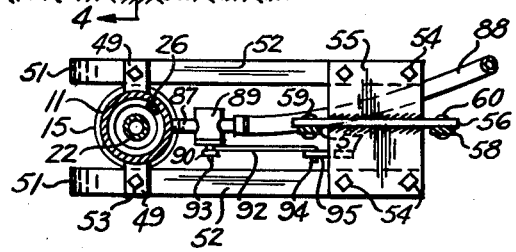
INVENTOR.
ALFRED KRIVDA
BY
Patrick D. Beaver
ATTY.

April 17, 1962 — A. KRIVDA — 3,029,756
AIR INJECTION DRILL
Original Filed March 5, 1959 — 2 Sheets-Sheet 2

INVENTOR.
ALFRED KRIVDA
BY Patrick D. Beavers
Atty.

3,029,756
AIR INJECTION DRILL
Alfred Krivda, P.O. Box 1403, Oroville, Calif.
Continuation of abandoned application Ser. No. 797,504, Mar. 5, 1959. This application Aug. 19, 1960, Ser. No. 50,669
5 Claims. (Cl. 111—6)

This invention relates to improvements in air injection drills that can be used to till the ground in the manner as when a disc harrow, plow or similar ground loosening agriculture implements are used.

This application comprises a continuation of my application entitled Air Injection Drill, filed March 5, 1959, Serial No. 797,504, now abandoned.

An object of this invention is to provide an air injection drill that by injecting a rapid succession of air blasts into the ground will cultivate a hay field or pasture land without disturbing the surface of the ground to any harmful extent.

With the above and other objects and advantages in view, the invention consists of the novel details of construction, arrangement and combination of parts more fully hereinafter described, claimed and illustrated in the accompanying drawings, in which:

FIG. 1 is an elevational view, partly in section, of an earth boring drill embodying the invention.

FIG. 2 is a transverse sectional view on the line 2—2 of FIG. 1;

FIG. 3 is a transverse sectional view on the line 3—3 of FIG. 1;

Figure 4:
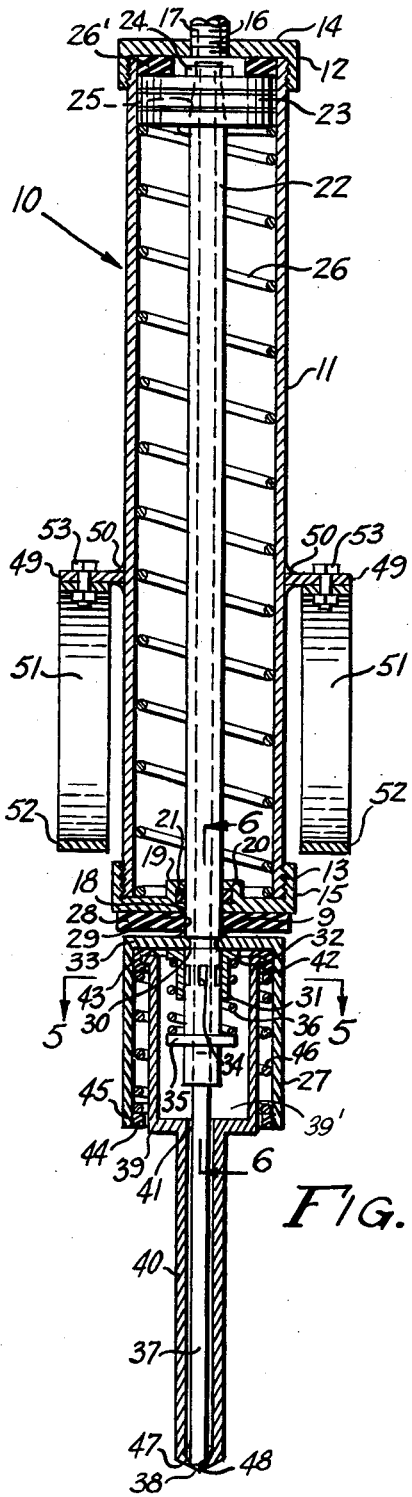
FIG. 4 is a vertical sectional view on the line 4—4 of FIG. 1.
Figure 5:
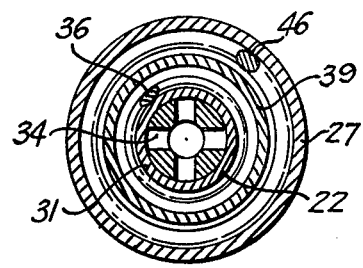
FIG. 5 is a transverse sectional view on the line 5—5 of FIG. 4.

Referring more in detail to the drawings, wherein like parts are designated by like reference numerals, the reference numeral 10 is used to generally designate an earth cultivating tool embodying the invention.

The earth cultivating tool 10 comprises a tubular cylindrical casing 11 having externally threaded ends 12 and 13, respectively. A top internally threaded closure 14 is engaged with the threads 12 and a bottom internally threaded closure 15 is engaged with the threads 13. The closure 14 has a threaded central opening 16 to receive a nipple 17 and the closure 15 has a central opening 18. A cylindrical flange 19 integral with the closure 15 and circumjacent with the opening 18, provides a chamber 20 in which is mounted a gasket seal 21.

Mounted for reciprocating movement within the casing 11 is a hollow piston rod 22 on which is mounted a piston 23 and a nut 24 retains the piston 23 on a tapered end 25 of the piston rod 22. A coil spring 26 is mounted in the casing 11 in circumjacent relation to the piston rod 22 and engages the undersurface of the piston 23 to urge the piston into engagement with a rubber stop washer 26′ that is positioned in the upper end of the casing 11 in engagement with the closure 14, to prevent the nut 24 from striking and damaging the inner surface of the closure 14.

Figure 6:
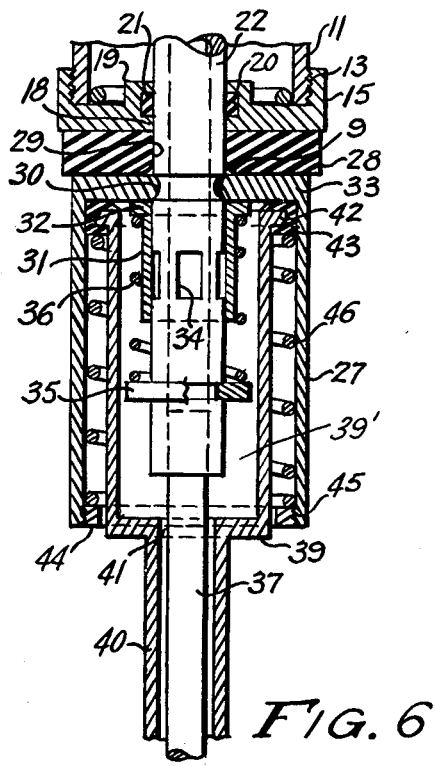
FIG. 6 is an enlarged vertical sectional view on the line 6—6 of FIG. 4.

The piston rod 22 in retracted position extends outwardly of the casing 11 approximately one-sixth of its length into an inverted cup shaped member 27 that engages a rubber vibration absorbing member and seal 28 that is secured to the outer surface of the closure 15. The member 28 is provided with a central opening 29 and the cup shaped member 27 is provided with a central opening 30 through which the piston rod 22 extends, and the cup shaped member 27 is secured to the piston rod 22 as by welding 9, FIG. 6.

A sleeve 31 is positioned over the piston rod 22 within the member 27 and the sleeve 31 has an annular flange 32 which engages the inner surface of the base 33 of the member 27 in circumjacent relation to the opening 30 in the member 27.

The sleeve 31 controls a plurality of relatively spaced ports 34 in the piston rod 22 so that as the piston rod 22 reciprocates, the ports 34 will be opened or closed by the sleeve 31. A collar 35 is secured to the piston rod 22 below the ports 34 and a coil spring 36 positioned on the piston rod 22 and sleeve 31 in circumjacent relation thereto, engages the flange 32 at one end and the collar 35 at the opposite end, to urge the annular flange 32 into engagement with the inner surface of the base 33.

Secured to the lower end of the piston rod 22 is a punch rod 37 having a hard point 38.

Mounted for reciprocation within the inverted cup shaped member 27 is a second cup shaped member 39 and an elongated sleeve 40 formed integral with the member 39. The sleeve 40 extends outwardly of the member 39 for the entire length of the punch rod 37 to house the punch rod 37 and the sleeve 40 communicates with the chamber 39′ by means of an opening 41 through which the punch rod 37 extends.

The member 39 has an annular piston shaped flange 42 at its open end over which is positioned a rubber seal 43 that seals the space between the flange 42 of the member 39 and the inner surface of the member 27 to prevent blow by of the air between the member 27 and the member 39. An externally threaded ring 44 is threaded into the open threaded end 45 of the member 27 and a coil spring 46 is mounted within the member 27 in circumjacent relation to the member 39 and one end of the spring 46 engages the seal 43 while the opposite end of the spring 46 engages the ring 45.

The lower portion of the sleeve 40 has a hardened tapered end or collar 47 that is provided with a port 48 that is opened or closed by the hard point 38 of the punch rod 37.

The casing 11 has a pair of diametrically opposed brackets 49 secured as by welding 50 to the outer surface thereof and the curved ends 51 of a pair of vibration dampening spring arms 52 are secured to the brackets 49 by fasteners 53. The opposite ends of the arms 52 are secured by fasteners 54 to a plate 55 that is secured to a hanger bar 56. A pair of suspension bars 57 and 58, respectively, are pivoted at their lower ends by pivot pins 59 and 60, respectively, to the hanger bar 56 and the bars 57 and 58 are pivoted at their upper ends by pivot pins 61 and 62, respectively, to a support bar 63. The support bar 63 has a right angularly extending plate 64 secured to the end thereof and fasteners 65 secure the plate 64 to a mounting member 66.

An air powered motor 67 is mounted on the member 66 and the motor 67 has a drive shaft 68 to which is secured a sprocket 69. The sprocket 69 is engaged by a drive chain 70 that also engages a sprocket 71 mounted on the shaft 72 of a conventional rotary valve 73. The shaft 72 has a crank arm 74 secured thereto that is pivotally connected at 75 to a link 76. The opposite end of the link 76 being pivotally connected at 77 to an apertured ear 78 secured to the arm 58.

The valve 73 is of the type having a single inlet and double outlet and has one coupling 79 that is connected by a hose 80 to an air compressor (not shown) and a coupling 81 that is connected by a hose 82 to the elbow 17 connected to the closure 14 of the casing 11. A manually operated valve 83 is positioned in the coupling 81 to control the air that is permitted to enter the casing 11 through the hose 82. The valve 73 is supported by a bracket 84 that is secured to the member 66 by fasteners 85.

The valve 73 also has a coupling 86 that is connected to a short piece of pipe 87 by an air hose 88. The pipe 87 is connected to and has communication with the casing 11 and a conventional rotary supply and exhaust valve 89 is interpolated in the pipe 87. A crank arm 90 is secured to the shaft 91 of the valve 89 and a link 92 is pivoted at one end at 93 to the crank arm 90 and at the opposite end at 94 to an apertured ear 95 that is secured to the under surface of the plate 55.

In the operation of the earth boring tool with the air compressor, not shown, in operation, the motor 67 is operated. The movement of the parts of the tool from the start of the motor is so synchronized that the operation thereof is controlled by the operation of the motor 67 and control of the valve 83.

The motor 67, by means of the drive chain 70, will rotate the valve 73. The shaft 72 of the valve 73 operates the crank arm 74 to oscillate the bars 57 and 58 about pivots 61 and 62 by means of the link 76. Thus, the casing 11 will oscillate with the bars 57 and 58. Air from the compressor enters the valve 73 through the hose 80. As the valve 73 rotates and bars 57 and 58 oscillate along with casing 11 air from the valve 73 enters the casing 11.

As the air enters the casing 11 it will impinge on the piston 23, driving it downward for the full stroke of the piston 23. During the stroke of the piston 23 the momentum of the piston 23 will be transmitted to the sleeve 31 and at the end of the stroke the sleeve will continue its downward movement against the upward force of the spring 36. The air pressure supplied to the casing 11 above piston 23 will also enter the hollow piston rod 22 whereby the air pressure within the casing 11 will pass outwardly of the ports 34 of the piston rod 22 into the chamber 39' after said downward movement of sleeve 31. The air pressure emitting from the ports 34 forces the member 39 downwardly against the force of spring 46 allowing the air pressure to pass outwardly of the sleeve 40 through the port 48 which up to that time has been closed by the hard point 38. Air pressure emitting from the port 48 impinges on and disturbs and cultivates the ground. Air pressure escapes through the ports 34 as long as the sleeve 31 remains in depressed position against the upward force of the spring 36. During downward movement of the piston 23, air which may be in the lower end of the cylinder 11 is exhausted through valve 89 which, at this point in the operation of the cultivator, is in its exhaust position. As the rotary valve 73 is operated to cut off flow to hose 82 and allow fluid under pressure to pass through hose 88, the bars 57 and 58 continue to oscillate due to the crank arm and link connection 74 and 76. During the oscillatory movement of the bars 57 and 58 caused by the rotation of valve 73 to change fluid flow from hose 82 through hose 88, the valve 89 is moved to supply position through the connecting link 92 pivotally secured to crank arm 90 fixed to the shaft 91 of the valve 89 and to the apertured ear 95 secured to plate 55. The fluid under pressure is admitted to the lower end of cylinder 11 through pipe 87 fixed thereto and together with compression spring 26 causes upward movement of the piston 23 to the position shown in FIG. 4.

As previously stated, the device is used to cultivate the ground and it is believed that from the foregoing description the construction and manner of operation will be apparent to those skilled in the art.

It is also to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. An earth cultivating tool comprising a casing having upper and lower portions, support means for said casing, a piston reciprocable in said casing, a hollow piston rod secured at one end to said piston and having its free end extending outwardly from the lower portion of said casing, a punch rod fixed in the free end of said piston rod, said piston rod having portions defining ports in the outwardly extending portion thereof, a first inverted cup-shaped member secured to the outwardly extending portion of said piston rod between said ports therein and the lower portion of said casing, a spring biased sleeve on said piston rod for coaction with said ports to control the opening and closing thereof, a spring biased second cup-shaped member in said first inverted cup-shaped member and having an integral sleeve portion coextensive with said punch rod, portions of said sleeve defining a port normally closed by said punch rod, a supply of fluid under pressure, valve means in communication with said supply of fluid under pressure, a first fluid supply conduit between said valve means and the upper portion of said casing, said valve means operable to allow passage of fluid from said supply through said first supply conduit into the upper portion of said casing to cause downward movement of said piston and piston rod to open said ports to admit fluid passing through said hollow piston rod into said second cup-shaped member to move the same and its integral sleeve portion relative to said first cup-shaped member and punch rod to inject the fluid into the ground, means connecting said valve means and said casing support to cause oscillation of the same upon operation of said valve means, a second fluid supply conduit between said valve means and the lower portion of said casing, said valve means further operable to prevent passage of fluid from said supply through said first conduit and allow passage of fluid from said supply into said second fluid supply conduit, valve means in said second supply conduit having an actuator operatively connected to said oscillatable casing support operable in response to oscillation thereof to actuate said last recited valve means to allow passage of fluid from said second supply conduit into the lower portion of said casing.

2. An earth cultivating tool as defined in claim 1 wherein said valve means for admitting fluid under pressure from said supply into said first and second fluid supply conduits comprises a motor driven rotary valve, and the means connecting said valve means to the support for said casing to cause oscillation thereof comprises a pivotal link.

3. An earth cultivating tool as in claim 1 wherein the support for said casing includes a pair of vertically disposed suspension bars for suspending said casing and vibration dampening spring arms mounted on the outer surface of said casing in opposed relation to each other connecting said casing to said bars.

4. An earth cultivating tool as in claim 1, wherein a coil spring is mounted in said casing in circumjacent relation to said piston rod to urge said piston upwardly in said casing.

5. An earth cultivating tool as in claim 1 wherein the open ends of said inverted cup-shaped member and said second cup-shaped member are provided with annular flanges and a spring is mounted in said inverted cup-shaped member in circumjacent relation to said second cup-shaped member with the ends of said spring in engagement with said flanges for urging said second cup-shaped member and sleeve upwardly so that the port therein is closed by the end of said punch rod.

No references cited.